United States Patent [19]

Kodama

[11] Patent Number: 5,329,109
[45] Date of Patent: Jul. 12, 1994

[54] PHOTOELECTRIC CONVERTING DEVICE HAVING A PLURALITY OF MONITORING MEANS FOR DETECTING POINT OF FOCUS WITH HIGH PRECISION FOR FOCUSING AREA LYING OVER A PLURALITY OF BLOCKS

[75] Inventor: Shinichi Kodama, Tokyo, Japan

[73] Assignee: Olympus Optical Co., Ltd., Tokyo, Japan

[21] Appl. No.: 72,474

[22] Filed: Jun. 4, 1993

[30] Foreign Application Priority Data

Jun. 8, 1992 [JP] Japan .................................. 4-147583

[51] Int. Cl.$^5$ .............................................. G01J 1/20
[52] U.S. Cl. ................................ 250/201.2; 354/402;
 348/230; 348/345
[58] Field of Search .................. 250/201.2, 201.5, 204,
 250/208.1; 358/227, 212, 213.19, 213.26,
 213.23; 354/402, 406, 409, 286

[56] References Cited

U.S. PATENT DOCUMENTS

| | | |
|---|---|---|
| 4,410,258 | 10/1983 | Aoki et al. . |
| 4,410,261 | 10/1983 | Masunaga et al. . |
| 4,509,842 | 4/1985 | Taniguchi et al. . |
| 4,831,403 | 5/1989 | Ishida et al. . |
| 4,952,963 | 8/1990 | Akashi . |
| 4,954,701 | 9/1990 | Suzuki et al. ................. 354/406 |
| 5,151,732 | 9/1992 | Akashi et al. ................. 354/402 |

FOREIGN PATENT DOCUMENTS

| | | |
|---|---|---|
| 57-16411 | 1/1982 | Japan . |
| 59-140408 | 8/1984 | Japan . |
| 62-100718 | 5/1987 | Japan . |
| 62-102213 | 5/1987 | Japan . |
| 63-246711 | 10/1988 | Japan . |
| 4-304407 | 10/1992 | Japan . |

OTHER PUBLICATIONS

NHK Technical Report, 1965, vol. 17, No. 1, No. 86, pp. 21–37.
Sensor Technology, MARUZEN Advanced Technology, Maruzen, Inc., By Kunio Tada, pp. 216–219, published Sep. 10, 1991, Tokyo, Japan.

Primary Examiner—David C. Nelms
Assistant Examiner—Que T. Le
Attorney, Agent, or Firm—Frishauf, Holtz, Goodman & Woodward

[57] ABSTRACT

A photoelectric converting device includes plurality of charge storage type photoelectric converting elements which are divided into a plurality of groups. A plurality of monitoring sections are respectively provided for the divided photoelectric converting element groups to output monitor signals corresponding to amounts of lights received by the photoelectric converting element groups. A first charge storage interruption section interrupts the charge storage operation of a corresponding one of the photoelectric converting element groups in a case where the monitor signal has reached a preset value after the photoelectric converting elements started the charge storage operation. A second charge storage interruption section forcedly interrupts the charge storage operation of the photoelectric converting element groups in a case where the charge storage operation is not interrupted by the first charge storage interruption section when a preset time has elapsed after the charge storage operation was started. A correcting section corrects an output of each of the plurality of photoelectric converting element groups to make the outputs of the photoelectric converting elements continuous in a case where the charge storage operations of the plurality of photoelectric converting element groups are interrupted at different timings by the first charge storage interruption section.

33 Claims, 15 Drawing Sheets

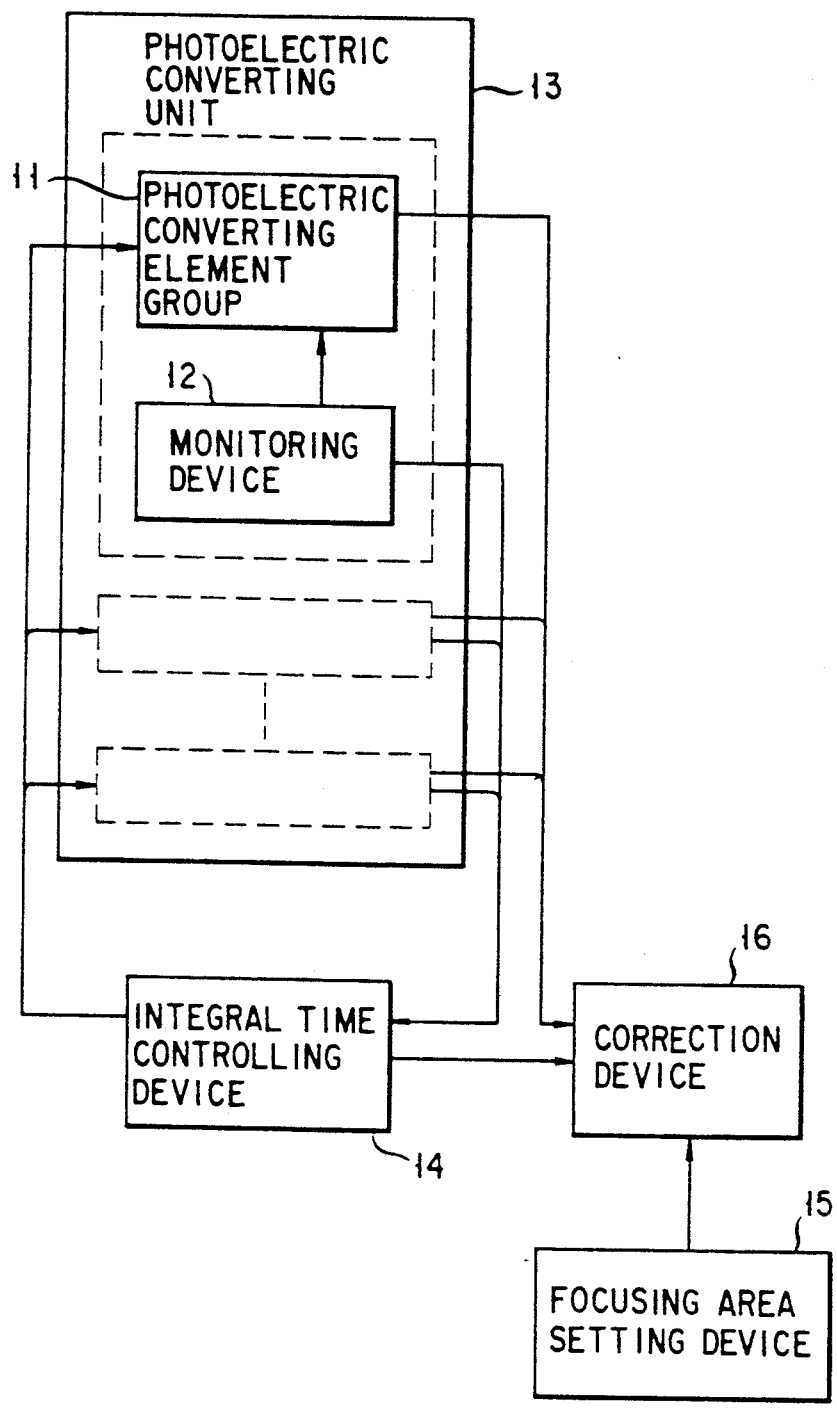
F I G. 1

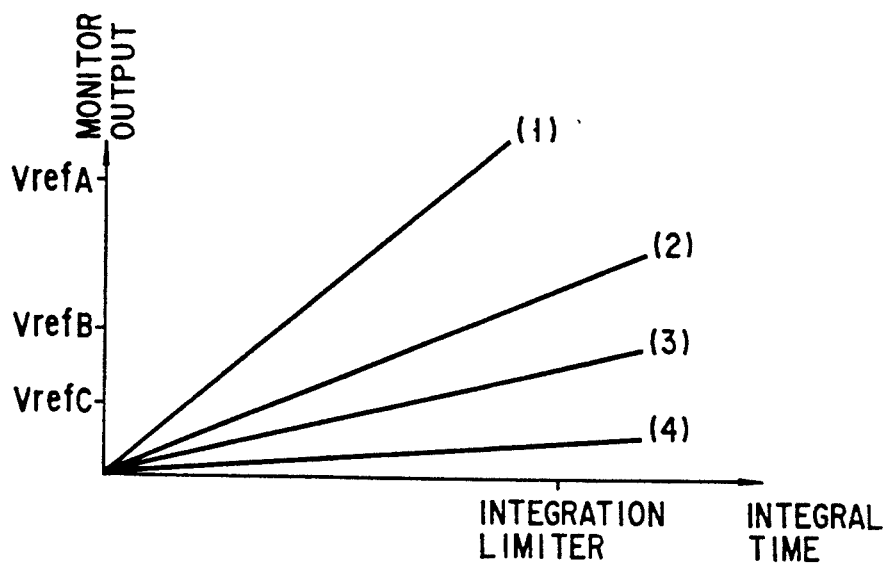
FIG. 4A
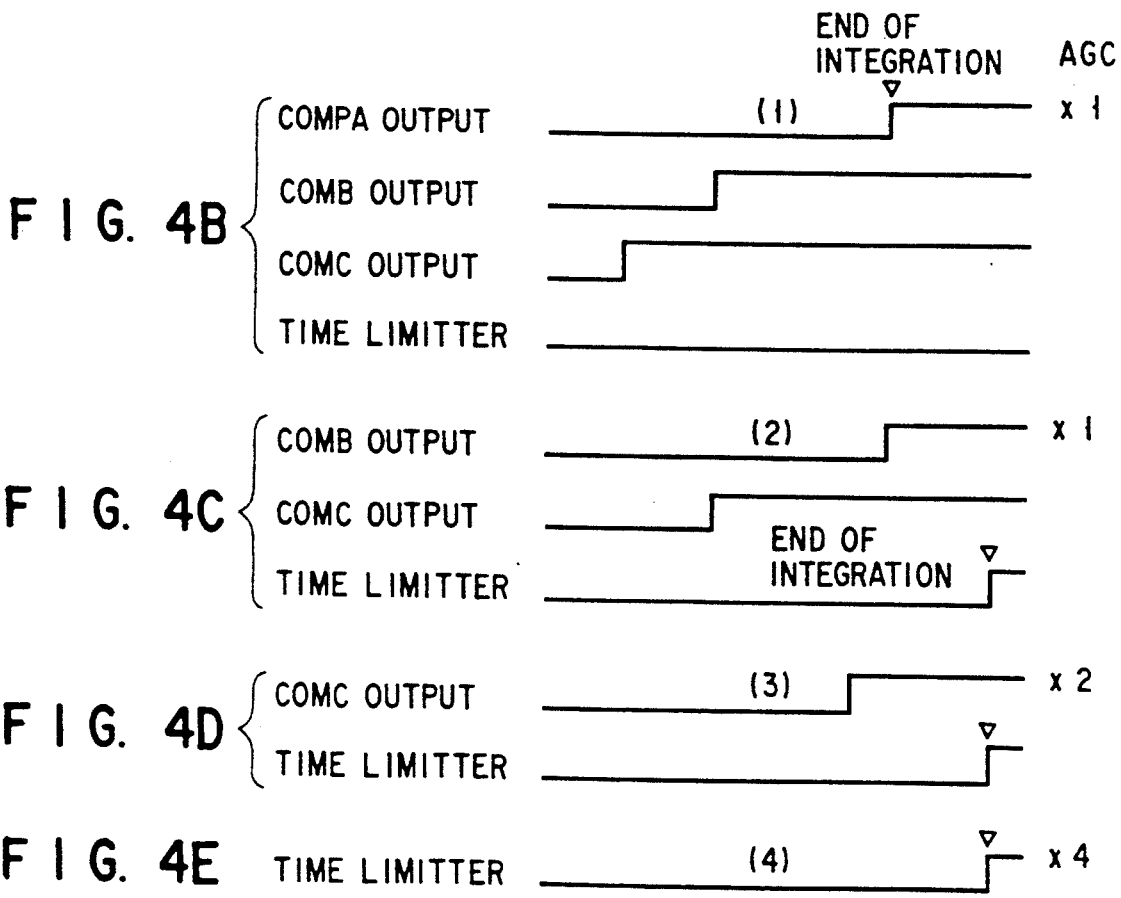
FIG. 4B
FIG. 4C
FIG. 4D
FIG. 4E

| PIXEL GROUP (1) | (2) | (3) | (4) |
FIG. 23A
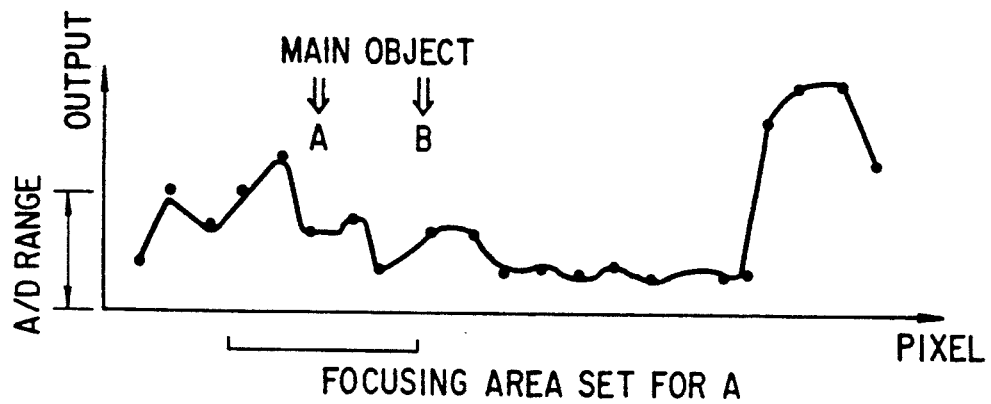
FIG. 23B
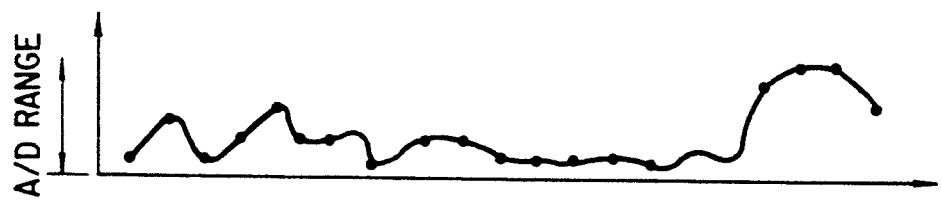
FIG. 23C
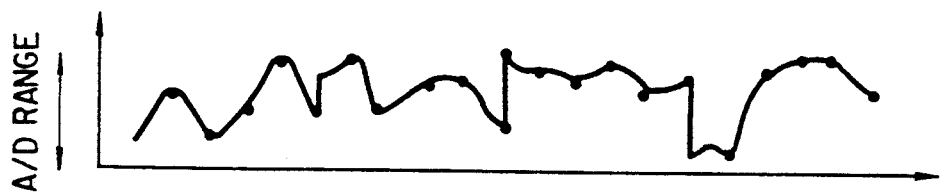
FIG. 23D

PHOTOELECTRIC CONVERTING DEVICE HAVING A PLURALITY OF MONITORING MEANS FOR DETECTING POINT OF FOCUS WITH HIGH PRECISION FOR FOCUSING AREA LYING OVER A PLURALITY OF BLOCKS

BACKGROUND OF THE INVENTION

1. Field of the Invention

This invention relates to a wide-field AF camera capable of setting a distance measuring area (focusing area) in a desired position in a photographing image plane and detecting the point of focus, and more particularly to a photoelectric converting device therefor.

2. Description of the Related Art

As an example of a conventional photoelectric converting device, a photoelectric converting device having a monitoring photo detector arranged near and in the same plane as a charge storage type image sensor to control the integral time of the image sensor is disclosed in U.S. Pat. No. 4,410,258.

When the area of an image sensor is enlarged to attain the wide-field distance measurement, the luminance distribution of wide dynamic range cannot be covered by use of only a single monitoring photo detector. Therefore, a method of dividing the image sensor into a plurality of blocks, providing monitoring photo detectors for the respective blocks and independently controlling the integral times thereof is considered. However, with this method, since a signal becomes discontinuous at the boundary portion between the blocks, the point of focus cannot be detected when a distance measuring area (focusing area) is set to lie over the two blocks.

The above problem is explained in more detail with reference to FIGS. 23A to 23D. FIGS. 23A to 23D show a case of wide-field line AF.

Assuming that four blocks of pixel groups (1), (2), (3) and (4) are provided as the focusing areas as shown in FIG. 23A, an actual light component shown in FIG. 23B is obtained. FIG. 23C shows an output obtained in a case where all of the focusing areas (1), (2), (3) and (4) are processed by use of the same integration controlling element. FIG. 23D shows an output obtained in a case where all of the focusing area blocks (1), (2), (3) and (4) are processed by use of respective integration controlling elements. When a main object lies in A or B, the dynamic range of the signal is determined by an amount of light of (4) which has no relation with the main object A or B in the case of FIG. 23C so that the precision of the point-of-focus detection will be lowered. In the case of FIG. 23D, since the light amounts in the focusing areas (1), (2), (3) and (4) are controlled to optimum values, there occurs no problem when the main object is B, but when the main object is A, since the light amounts in the focusing areas (1) and (2) are not continuous, the actual light distribution cannot be reproduced.

SUMMARY OF THE INVENTION

Accordingly, an object of this invention is to provide a photoelectric converting device capable of detecting the point of focus with high precision even when a focusing area is set to lie over two or more blocks in a camera which effects the wide-field AF by use of an image sensor formed of a plurality of photoelectric converting element blocks.

In order to attain the above object, a photoelectric converting device of this invention comprises:

a plurality of charge storage type photoelectric converting elements divided into a plurality of groups;

a plurality of monitoring means respectively provided for the divided photoelectric converting element groups, for outputting monitor signals corresponding to amounts of lights received by the photoelectric converting element groups;

first charge storage interruption means for interrupting the charge storage operation of that of the photoelectric converting element groups whose monitoring signal has reached a preset value after the photoelectric converting elements started the charge storage operation;

second charge storage interruption means for forcedly interrupting the charge storage operation of the photoelectric converting element groups in a case where the charge storage operation is not interrupted by the first charge storage interruption means when a preset time has elapsed after the charge storage operation was started; and correction means for correcting outputs of the plurality of respective photoelectric converting element groups to make the outputs of the photoelectric converting elements continuous in a case where the charge storage operations of the plurality of photoelectric converting element groups are interrupted at different timings by the first charge storage interruption means.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a conceptional diagram of one embodiment of this invention;

FIGS. 4A to 4E are diagrams showing integration outputs of the sensor;

FIGS. 23A to 23D are diagrams for illustrating the defect of the conventional wide-field line AF.

DETAILED DESCRIPTION OF THE PREFERRED EMBODIMENTS

Figure 2:
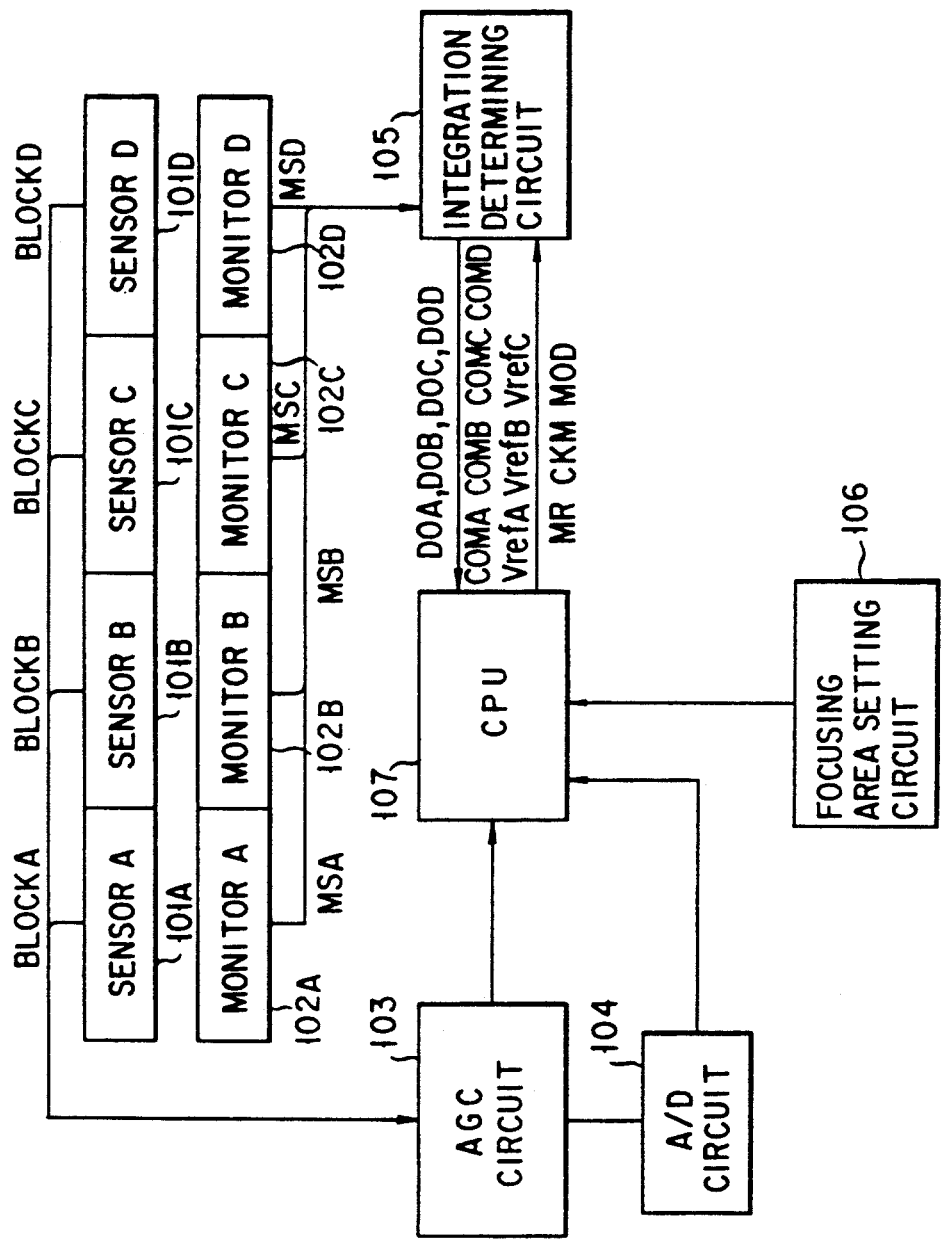
FIG. 2 is a schematic diagram of a sensor controlling section according to a first embodiment of this invention.

FIG. 1 is a conceptional diagram showing one embodiment of this invention. A photoelectric converting device of this embodiment includes a photoelectric converting unit 13 having a plurality of sets of photoelectric converting elements 11 for converting a light component into an electrical component and monitoring devices 12 for detecting the light amount components of the respective photoelectric converting elements 11, an integral time controlling device 14 for supplying an integration starting signal to each of the photoelectric converting elements 11 of the photoelectric converting unit 13, detecting and storing respective integral times in response to completion-of-integration signals from the corresponding monitoring devices 12 and having a function of an integration limiter, a correction device 16 for reading out pixel signals from the photoelectric converting elements 11 of the photoelectric converting unit 13, reading out focusing area setting position information from a focusing area setting device 15, and reading out integral times of the respective photoelectric converting elements 11 of the photoelectric converting unit 13 from the integral time controlling device 14 to effect the correcting process, and the focusing area setting device 15 for setting a focusing area in a desired position in a wide range setting permissible area.

With this construction, when a focusing area set by the focusing area setting device 15 lies over a plurality of sets of the photoelectric converting elements and the monitoring devices 12 of the photoelectric converting unit 13, respective pixel signals are corrected according to the detected integral times to derive a point-of-focus detection signal.

A first embodiment of this invention is explained below.

FIG. 2 is a conceptional diagram showing a sensor controlling section. The wide-field line sensor AF is explained. In FIG. 2, a sensor A (101A), sensor B (101B), sensor C (101C), sensor D (101D), and a monitor A (102A), monitor B (102B), monitor C (102C), monitor D (102D) constitute the photoelectric converting unit. Further, focusing blocks corresponding to the sensors A, B, C and D are blocks A, B, C and D.

The sensor controlling section further includes an AGC circuit 103 for amplifying a sensor output, an integration determining circuit 105 for determining the monitor output level, an A/D circuit 104 for converting an output of the AGC circuit 103 into a digital value, a focusing area setting circuit 106 for setting a focusing area in a desired position in a focusing area setting permissible area (four areas of focusing blocks), and a CPU 107 for correcting a signal in the set focusing area based on the amplification factors of the respective focusing blocks from the AGC circuit 103 and the integral times of the respective focusing blocks detected based on the signal from the integration determining circuit 105 and the focusing area setting position of the focusing area setting circuit 106.

Figure 3:
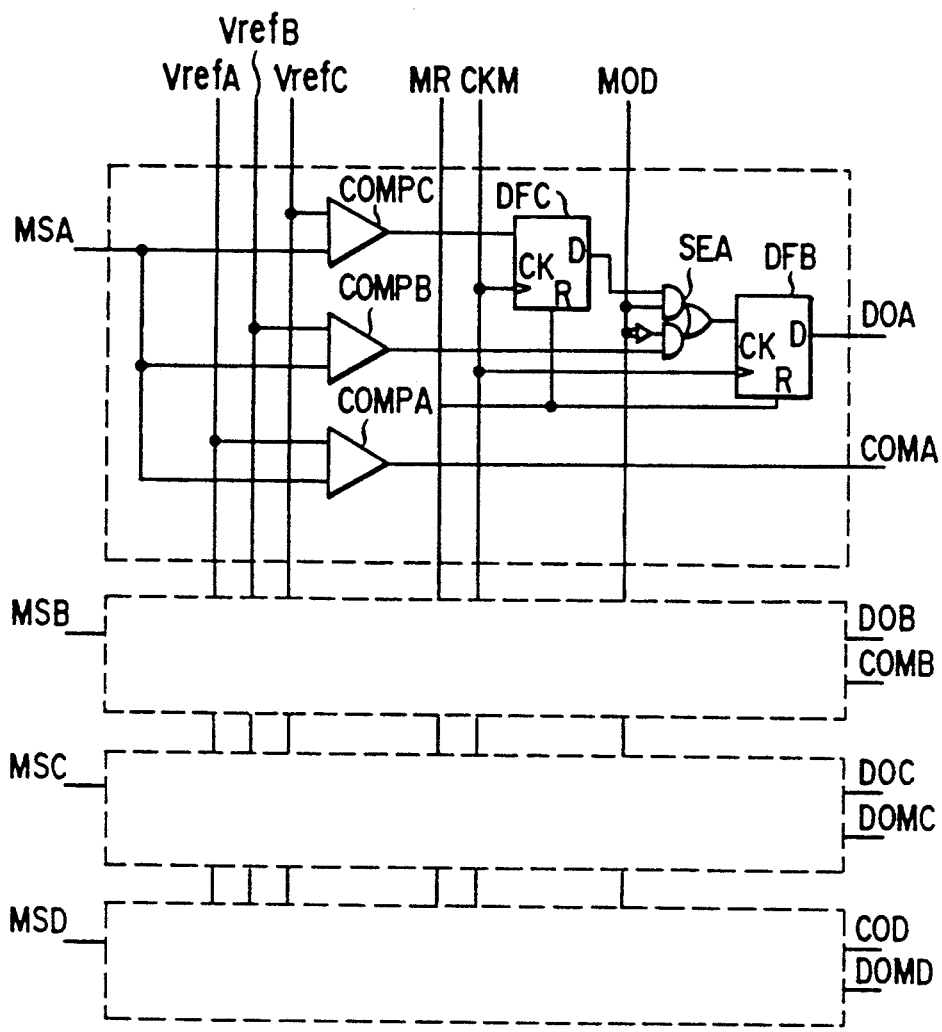
FIG. 3 is a diagram showing the internal construction of an integration determining circuit.

FIG. 3 is a diagram showing the internal construction of the integration determining circuit 105. As is understood from FIG. 3, four circuit blocks (MSA, MSB, MSC, MSD) having the same circuit block structure for determining the integration level are provided for the respective focusing blocks in the integration determining circuit.

One of the circuit blocks for the focusing block (sensor A, monitor A) is explained below. The block includes comparison determining circuits COMPA, COMPB and COMPC for comparing a signal MSA from the monitor A with respective reference levels VrefA, VrefB and VrefC, circuits DFC and DFB for storing the results of comparison with the reference levels VrefB and VrefC, and a circuit SEA for selectively setting a signal communication mode with respect to the CPU 107 or a storing mode of the comparison determining circuits according to a MOD signal.

FIGS. 4A to 4E are diagrams showing integration outputs of the sensor. FIG. 4A shows a variation in the level of the signal with time when the brightness is different according to cases (1) to (4) (the case (1) is a bright case and the case (4) is a dark case). FIGS. 4B to 4E show outputs of the circuits COMPA, COMPB and COMPC and the amplification factors in the respective cases (assume that VrefA=2*VrefB=4*VrefC).

Since it is bright in the case (1) of FIG. 4B, the integration is not completed by the integral time limiter and the outputs of the circuits COMPC, COMPB and COMPA are changed when the outputs exceed the levels VrefA, VrefB and VrefC. The integration is completed when the output of the circuit COMPA is inverted.

In the case (2) of FIG. 4C, it is darker than in the case (1), and a preset time of the integral time limiter is reached and the integration is completed when the outputs of the circuits COMPB and COMPC are inverted. The amplification factor is set to "x1".

In the case (3) of FIG. 4D, it is darker than in the case (2), and a preset time of the integral time limiter is reached and the integration is completed when the output of the circuit COMPC is inverted. The amplification factor is set to "x2".

In the case (4) of FIG. 4E, it is darker than in the case (3), and the output of the circuit COMPC is not inverted, a preset time of the integral time limiter is reached and the integration is completed. The amplification factor is set to "x4".

The CPU stores the amplification factors of the respective focusing blocks as AGC for the respective focusing blocks.

Figure 5:
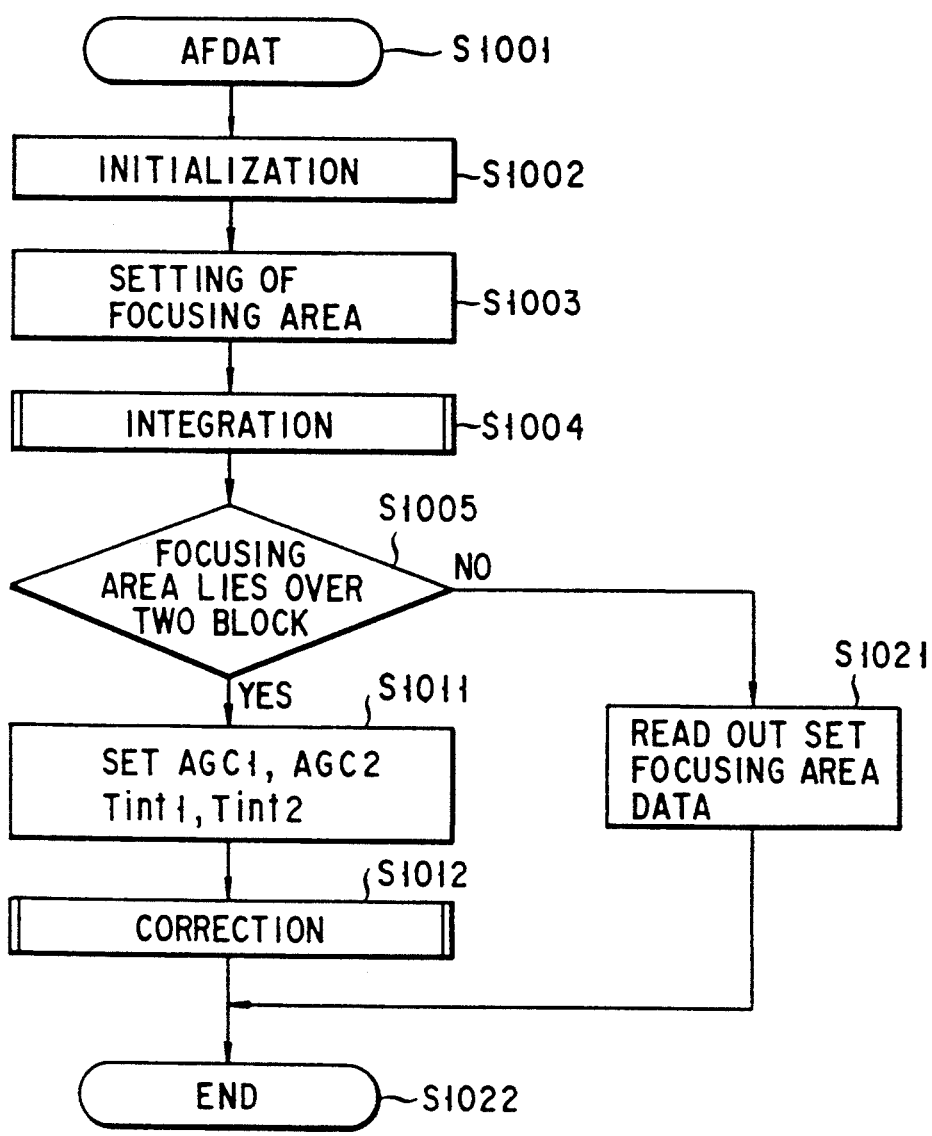
FIG. 5 is a flowchart showing the operation of setting AF data.

FIG. 5 is a flowchart showing the operation of setting AF data.

First, AFDAT is started (S1001). Then, in S1002, information associated with AF is initialized and a focusing area is set in S1003. Next, the sub-routine of integration is effected (S1004) and it is determined whether the newly set focusing area lies over two focusing blocks or not (S1005). When it lies over the two focusing blocks, the amplification factors and integral times of the two focusing blocks are set to AGC1 and AGC2 (corresponding to the amplification factors agcA, agcB, agcC, agcD of the respective blocks) and Tint1 and Tint2 (corresponding to integral times ta, tb, tc, td of the respective blocks) (S1011) and then the sub-routine of correction is effected (S1012).

On the other hand, when the newly set focusing area does not lie over the two blocks, a signal of the focusing area is read out as it is (S1021). After this, this sequence is completed (S1022).

Figure 6:
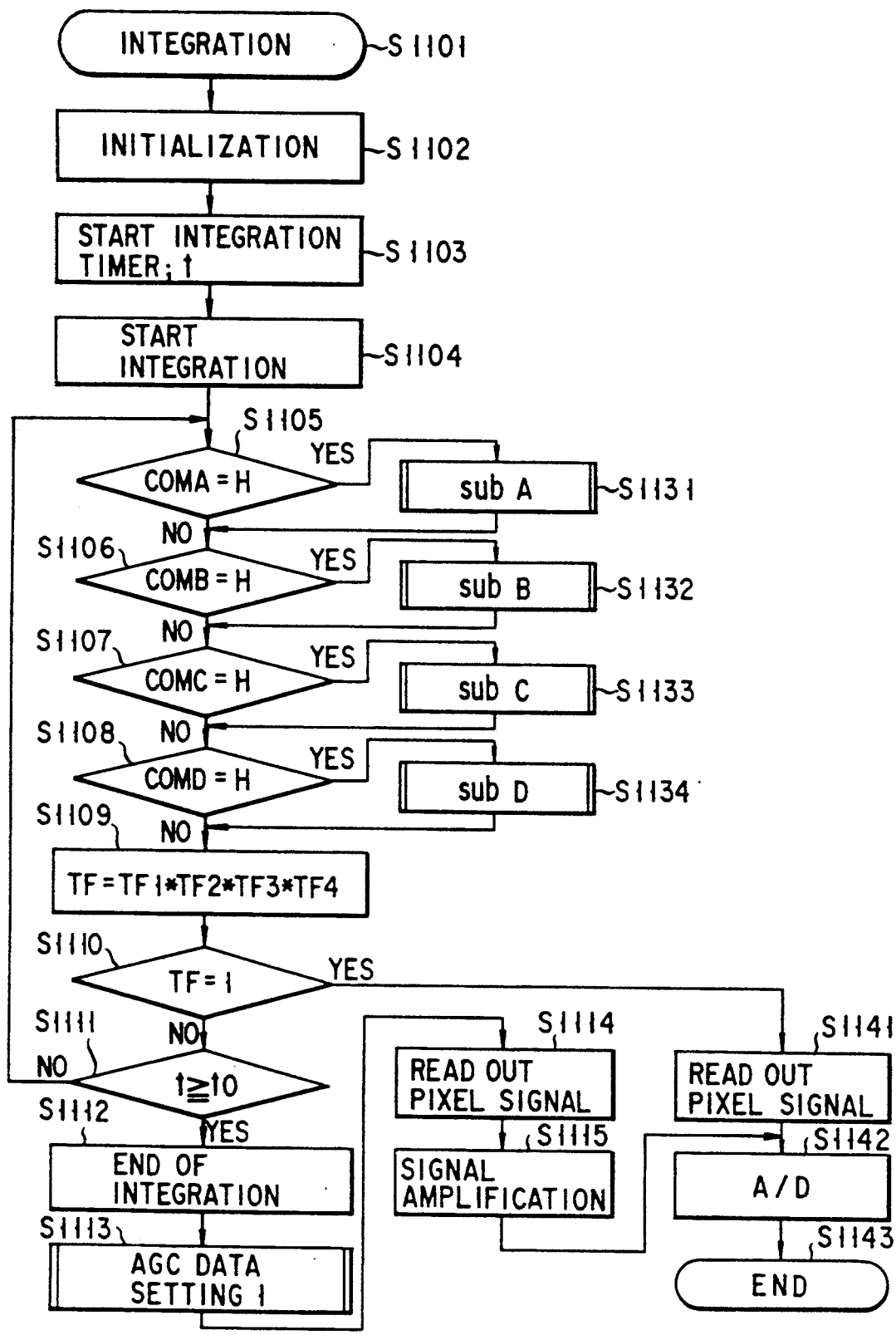
FIG. 6 is a flowchart showing the sub-routine of integration.

FIG. 6 is a flowchart showing the sub-routine of integration. First, the sub-routine integration is started (S1101). Next, information (integration timer, flags of monitor detection levels TF=TF1=TF2=TF3=TF4=0) associated with the integration is initialized (S1102). Then, the integration timer is triggered (S1103) to start the integration (S1104).

Next, whether the output level of COMA is "H" or not is checked (S1105), and in a case wherein COMA="H", the sub-routine SubA is effected (S1131). Further, whether the output level of COMB is "H" or not is checked (S1106), and in a case wherein COMB="H", the sub-routine SubB is effected (S1132). Likewise, whether the output level of COMC is "H" or not is checked (S1107), and in a case wherein COMC="H", the sub-routine SubC is effected (S1133). Further, whether the output level of COMD is "H" or not is checked (S1108), and in a case wherein COMD="H", the sub-routine SubD is effected (S1134).

Next, integration flags of the respective flags are set (S1109) and the flags TF are checked (S1110). If the flag TF is not "1" (TF=TFi*TF2*TF3,TF4, TF1, TF2, TF3, TF4 are set to "1" when the integration in the corresponding focusing block is completed without using the timer limiter), the timer limiter of integral time (preset integral time t0) is checked (S1111). If the integral time does not reach t0, S1105 is effected again and the integration is completed when the integral time has reached a preset integral time (S1112).

Next, the sub-routine of AGC data setting 1 relating to the setting of the amplification factor is effected (S1113). Then, a pixel signal is read out (S1114) and the signal is amplified based on the AGC data (S1115).

When it is detected in S1110 that TF="1", a pixel signal is read out (S1141) and the A/D converting process for converting the pixel signal data into a digital value is effected (S1142). After this, this sequence is completed (S1143).

Figure 7:
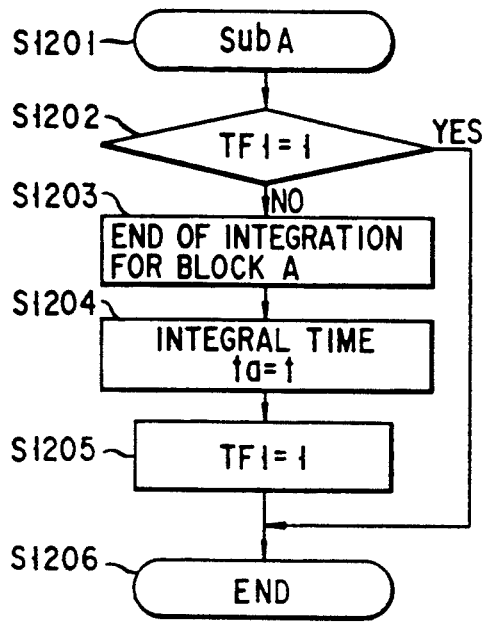
FIG. 7 is a flowchart showing the sub-routine SubA for storing the completion of integration and the completion time of the integration.

FIG. 7 is a flowchart showing the sub-routine SubA for storing the completion of integration and the completion time of the integration.

First, the sub-routine SubA is started (S1201). Then, whether TF1="1" or not is checked (S1202). If TF is not "1", the integration for the focusing block A is completed (S1203). Next, the integration completion time is stored into the integration completion time ta (S1204). Then, TF1 is set to "1" (S1205). If it is detected in S1202 that TF1="1", S1206 is effected to complete this sequence.

Figure 8:
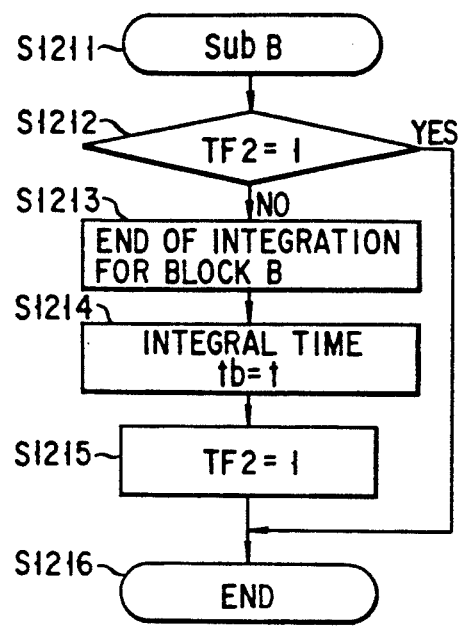
FIG. 8 is a flowchart showing the sub-routine SubB.
Figure 9:
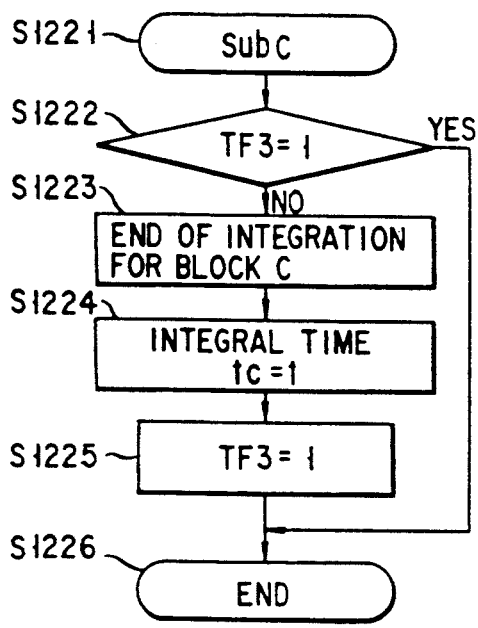
FIG. 9 is a flowchart showing the sub-routine SubC.
Figure 10:
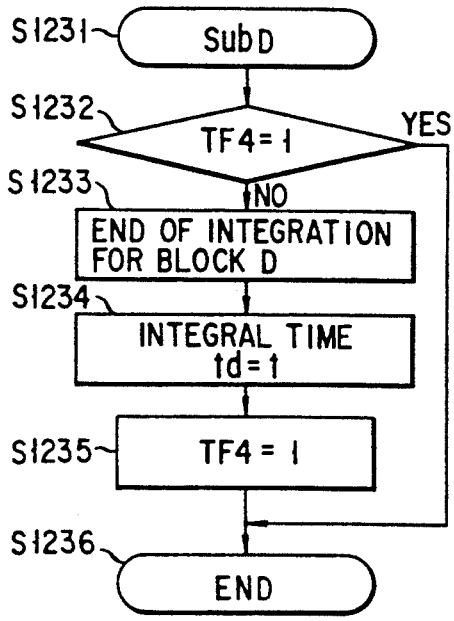
FIG. 10 is a flowchart showing the sub-routine SubD.

FIGS. 8, 9 and 10 show the sub-routines SubB, SubC and SubD which are the same as the sub-routine SubA. As shown in the respective sub-routines of FIGS. 8, 9 and 10, the sub-routines SubB, SubC and SubD store the completion of integration and integral times associated with the respective focusing blocks B, C and D.

Figure 11:
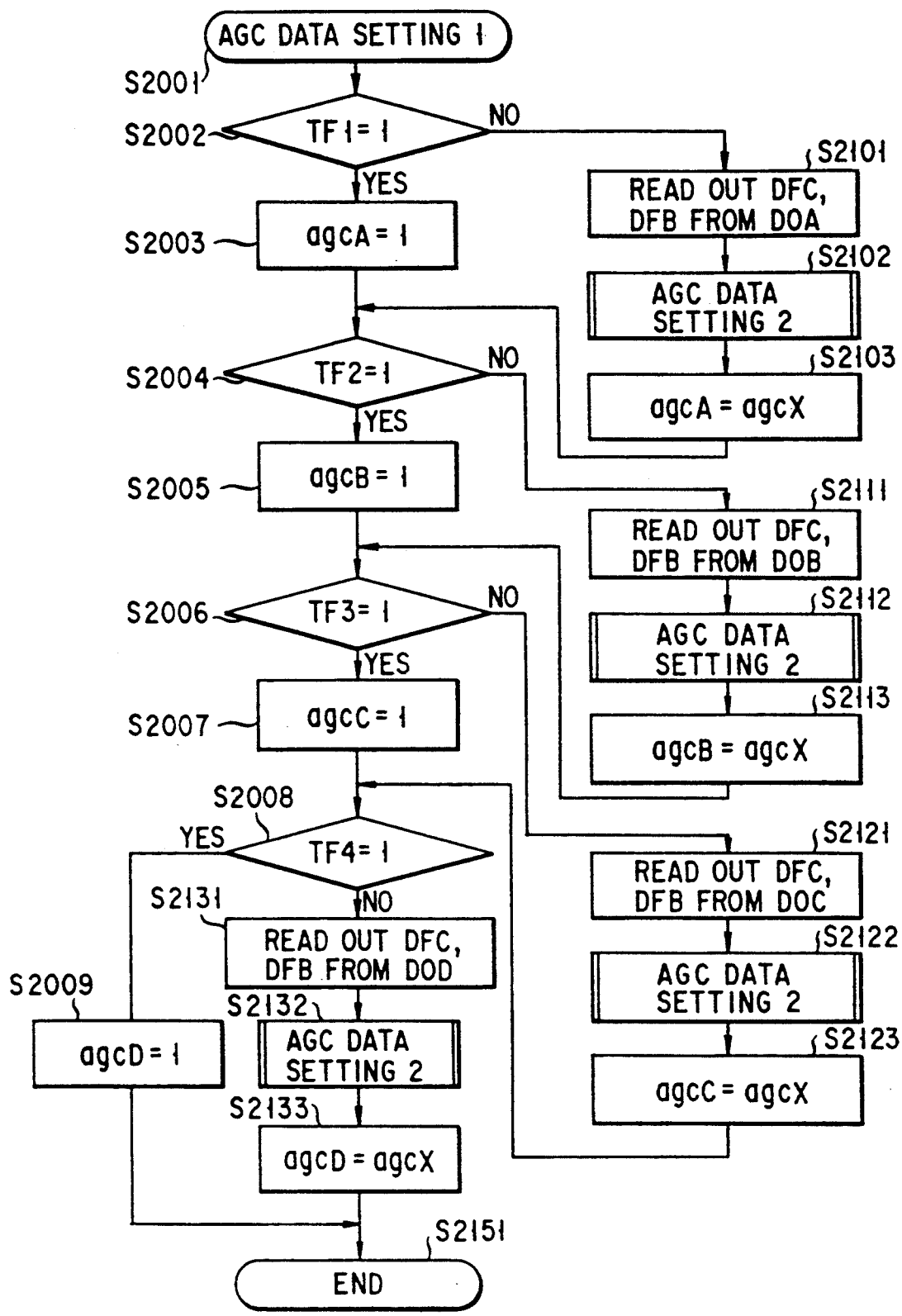
FIG. 11 is a flowchart showing the sub-routine for setting the amplification factor.

FIG. 11 is a flowchart showing the sub-routine for setting the amplification factor.

First, the sub-routine of "AGC data setting 1" is started (S2001). Then, whether the flag TF1="1" or not is checked (S2002). In a case where the flag TF1="1", the amplification factor of the focusing block A is set to agcA=1 (S2003). When the flag TF1 is not "1", DFC and DFB are read out from a line DOA (S2101). Next, the sub-routine "AGC data setting 2" for effecting the detail setting of amplification factor (agcX) is effected (S2102). Then, the amplification factor agcA of the focusing block A is set to agcX (S2103).

Next, whether the flag TF2="1" or not is checked (S2004), and in the case of TF2="1", the amplification factor agcB of the focusing block B is set to "1" (S2005). Further, if the flag TF2 is not "1", DFC and DFB are read out from a signal line DOB (S2111). Next, the sub-routine "AGC data setting 2" for effecting the detail setting of amplification factor (agcX) is effected (S2112). Then, the amplification factor agcB of the focusing block B is set to agcX (S2113).

Next, whether the flag TF3="1" or not is checked (S2006), and in the case of TF3="1", the amplification factor agcC of the focusing block C is set to "1" (S2007). Further, if the flag TF3 is not "1", DFC and DFB are read out from a signal line DOC (S2121). Next, the sub-routine "AGC data setting 2" for effecting the detail settign of amplification factor (agcX) is effected (S2122). Then, the amplification factor agcC of the focusing block C is set to agcX (S2123).

Next, whether the flag TF4="1" or not is checked (S2008), and in the case of TF4="1", the amplification factor agcD of the focusing block D is set to "1" (S2009). Further, if the flag TF4 is not "1", DFC and DFB are raed out from a signal line DOD (S2131). Next, the sub-routine "AGC data setting 2" for effecting the detail setting of amplification factor (agcX) is effected (S2132). Then, the amplification factor agcD of the focusing block D is set to agcX (S2133). After this, this sequence is completed (S2151).

Figure 12:
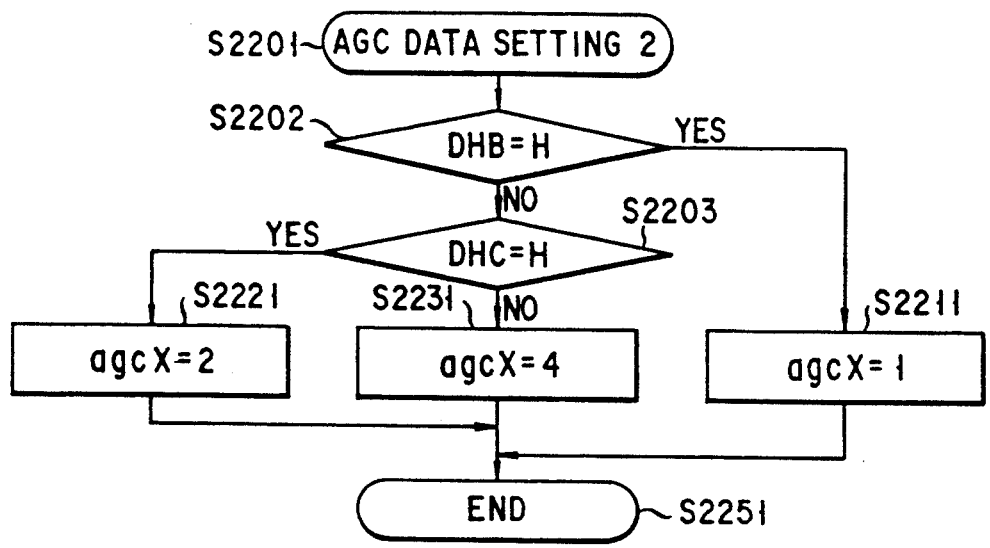
FIG. 12 is a flowchart showing the sub-routine for setting the detail of the amplification factor.

FIG. 12 is a flowchart showing the sub-routine for setting the detail of the amplification factor.

First, the sub-routine "AGC data setting 2" is started (S2201). Then, a DFB output is checked (S2203). In the case of DFB="H", the amplification factor agcX is set to "1" (S2211).

Further, when DFC="H", the amplification factor agcX is set to "2" (S2221). On the other hand, if DFC is not "H", the amplification factor agcX is set to "4" (S2231). After this, this sequence is completed (S2251).

Figure 13:
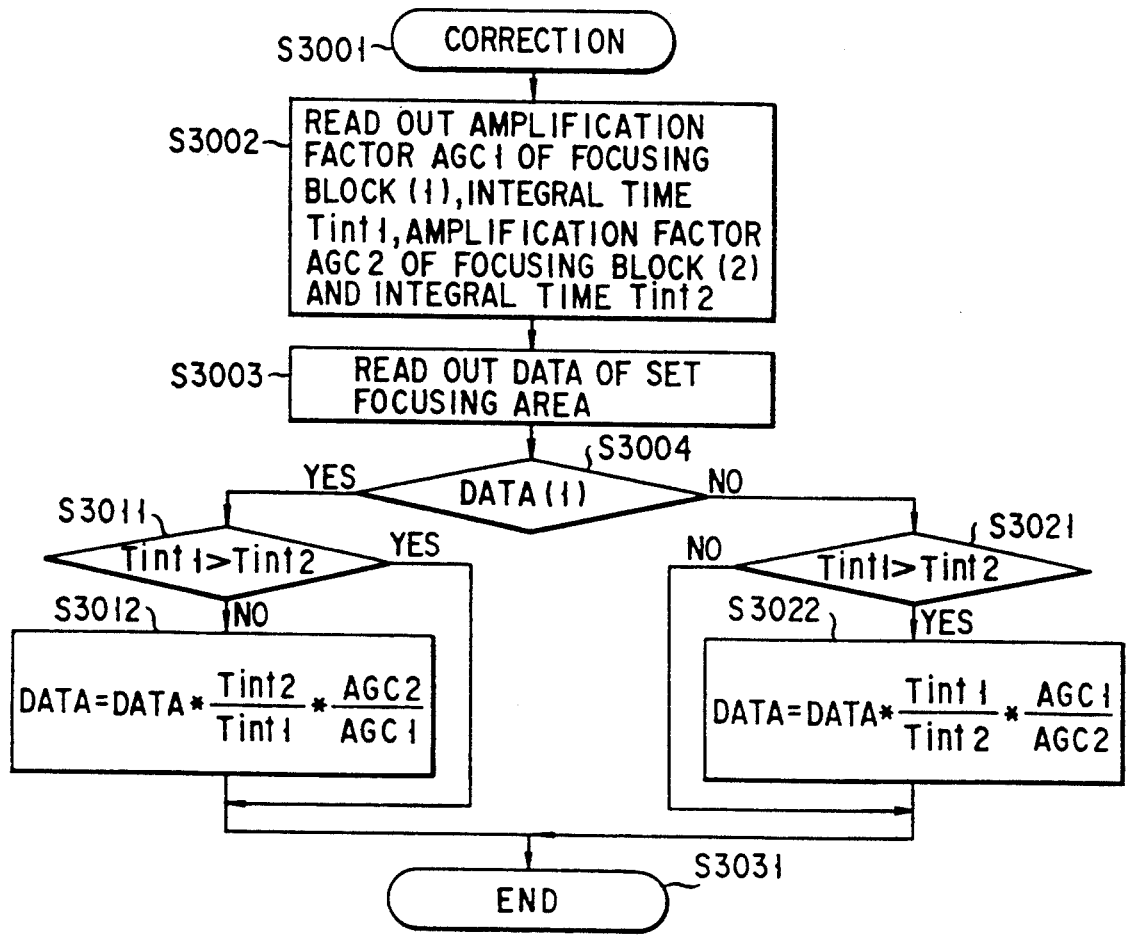
FIG. 13 is a flowchart showing the sub-routine of correction.

FIG. 13 is a flowchart showing the sub-routine "correction". Assume that the two focusing blocks over which the set focusing area lies are denoted by (1) and (2).

First, the sub-routine "correction" is started (S3001). Then, the integral times and amplification factors of the focusing blocks over which the focusing area lies are read out as the integral time Tint1 and amplification factor AGC1 for the focusing block (1) and as the integral time Tint2 and amplification factor AGC2 for the focusing block (2) (S3002). Next, data of the set focusing area is read out (S3003). Then, whether the readout data is (1) or (2) is checked (S3004). When the readout data is data of (1), the integral times are compared (Tint1, Tint2) (S3011). When Tint1>Tint2, S3031 is effected and the process is completed. Further, when Tint1 is not larger than Tint2, the readout data is replaced by (readout data)*(Tint2/Tint1),(AGC-2/AGC1) (S3012).

On the other hand, if the readout data is not data of (1), the integral times are compared (Tint1, Tint2) (S3021). When Tint1 is not larger than Tint2, S3031 is effected and the process is completed. Further, when Tint1 > Tint2, the readout data is replaced by (readout data)*(Tint1/Tint2),(AGC1/AGC2) (S3022). After this, this sequence is completed (S3031).

Figure 14:
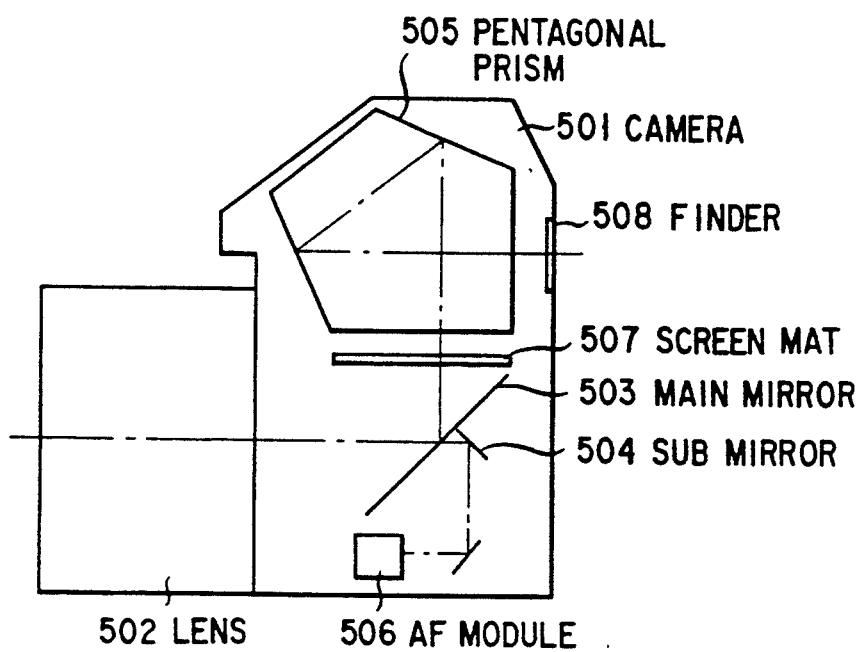
FIG. 14 is a view showing an example in which the sensor of this invention is used as an AF sensor of a camera.

FIG. 14 is a view showing an example in which the sensor of this invention is used as an AF sensor of a camera. In FIG. 14, a flux of light passing through a lens 502 is guided to a finder 508 via a main mirror 503, screen mat 507, and pentagonal prism 505. An AF module 506 disposed on the bottom portion of a camera body 501 guides a flux of light passing through the half-mirror portion of the main mirror 503 having a half-mirror property in the central portion thereof to the AF module 506 via a sub-mirror 504.

Figure 15:
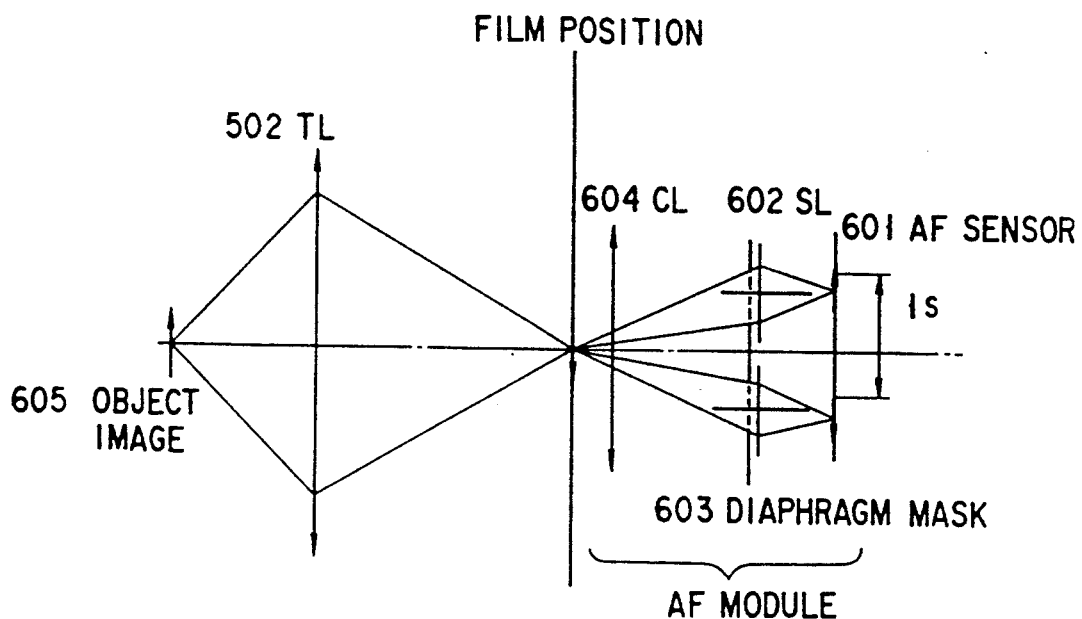
FIG. 15 is a diagram showing the optical structure of an AF module.

FIG. 15 shows the optical structure of an AF module. In FIG. 15, an image of an object 605 is transmitted to the film position via a lens TL502. The image in the film position is transmitted via a condenser lens CL604 disposed near the film position, and an image created by a separator lens SL602 which can effect the pupil division of the image via a diaphragm mask 603 is detected by an AF sensor 601.

Figure 16:
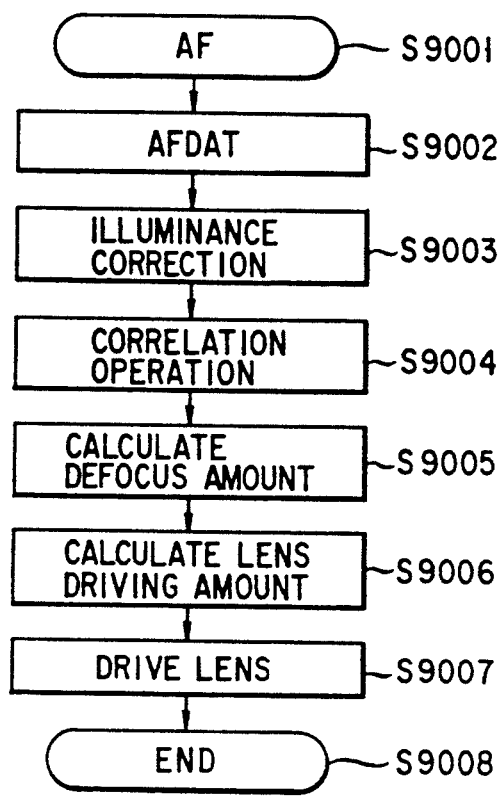
FIG. 16 is a flowchart showing the AF procedure.

FIG. 16 is a flowchart showing the AF procedure.

First, the AF process is started (S9001). Then, the sub-routine AFDAT (shown in FIG. 5) for AF data creation is effected (S9002). Next, the AF optical system is subjected to correction of light extinction in the peripheral portion by use of the cosine fourth-power rule (S9003). The correction method is disclosed in Japanese Patent Disclosure No. S.57-16411 or the like. Then, the correlation operation for detecting a distance ls between the two images created by the pupil division is effected (S9004). The correlation operation is disclosed in Japanese Patent Disclosure No. S.62-102213 or the like. Next, a defocus amount is calculated based on the distance ls between the two images (S9005). The calculation is disclosed in Japanese Patent Disclosure No. S.62-100718 or the like. Then, a lens driving amount is calculated based on the defocus amount (S9006). The calculation is disclosed in Japanese Patent Disclosure No. S.59-140408 or the like. Next, the lens is driven (S9007) and this sequence is completed (S9008).

With the construction of the embodiment described above, the point of focus can be detected with high precision with a simple construction even when a focusing area is set in a desired position in a focusing block.

Next, a second embodiment of this invention is explained. In this embodiment, a 2-dimensional sensor is used as a sensor for the photoelectric converting device and is used for both of image and AF. In this embodiment, the sensor is constructed so as to directly monitor an image based on the pixel signal (Japanese Patent Application No. H.03-092685, corresponding Unexamined Japanese Patent Application Publication No. 04-304407).

Figure 17:
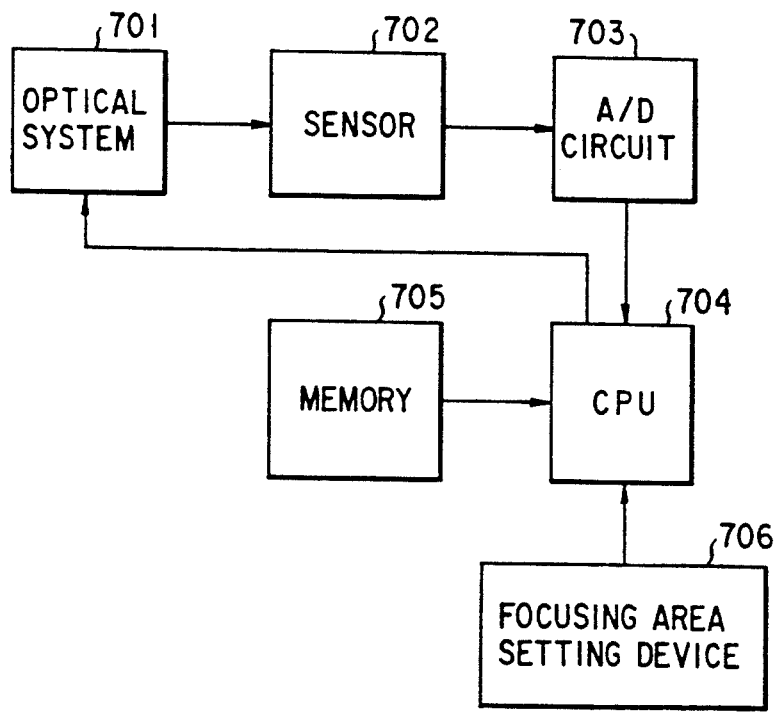
FIG. 17 is a diagram showing the construction of a second embodiment of this invention.

As shown in FIG. 17, the photoelectric converting device of this embodiment includes an image pickup optical system 701, a sensor 702, an A/D circuit 703, a CPU 704 for effecting the creation of a focusing area signal and AF operation based on the sensor signal which has been subjected to the A/D conversion, correcting all of the areas by use of the integral time and amplification factor, and storing the corrected data into a memory 705, a focusing area setting circuit 706 for setting a focusing area, and the memory 705 for storing image data.

Figure 18:
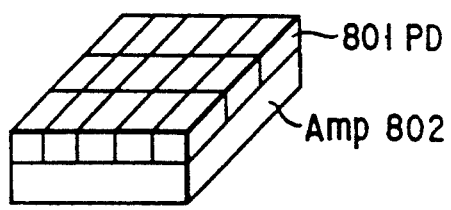
FIG. 18 is a view showing the structure of a sensor of this invention.

FIG. 18 is a view showing the structure of the sensor. The sensor is a sensor of 3-dimensional structure ("SENSOR TECHNOLOGY" MARUZEN Inc. KUNIO TADA, p217, for example), and a photodiode group PD801 is arranged in the first layer and Amp802 having pixel monitoring function circuits and amplification factor varying circuits is arranged in the second or higher level layer.

Figure 19:
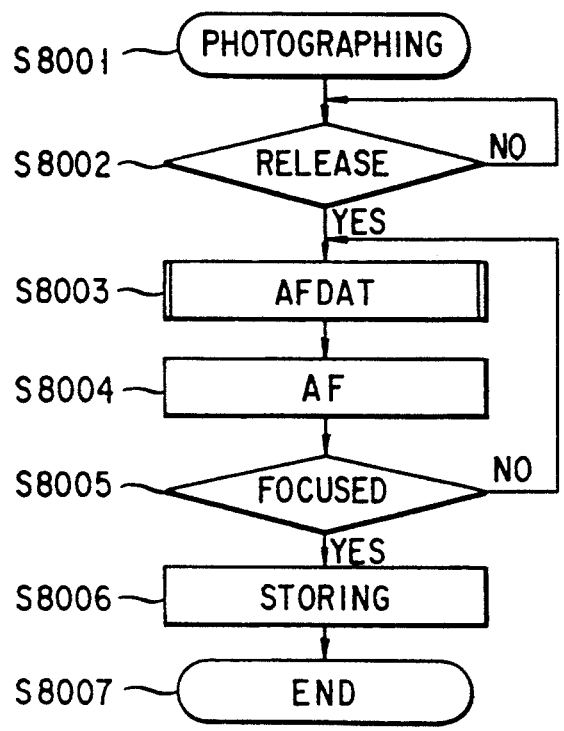
FIG. 19 is a flowchart showing the photographing procedure.

FIG. 19 is a flowchart showing the photographing procedure. In FIG. 19, the photographing process is started (S8001). Then, the release condition is checked (S8002). When the release condition is set in the OFF state, S8002 is effected again, and when the release condition is set in the ON state, the sub-routine AFDAT (shown in FIG. 5) associated with the focusing area setting is effected (S8003).

In the sequences of S8004 and S8005, the photographing optical system 701 is driven by use of the AF system called a hill-climbing method (NHK Technical Report, 1965, Vol. 17, No. 1, Whole Number 86, Term 21, for example) until the focusing level is reached. If the focusing level is not attained in S8005, S8003 is effected again, and if the focusing level is attained, data corrected based on data of dark pixels is stored (S8006). After this, this sequence is completed (S8007).

Figure 21:
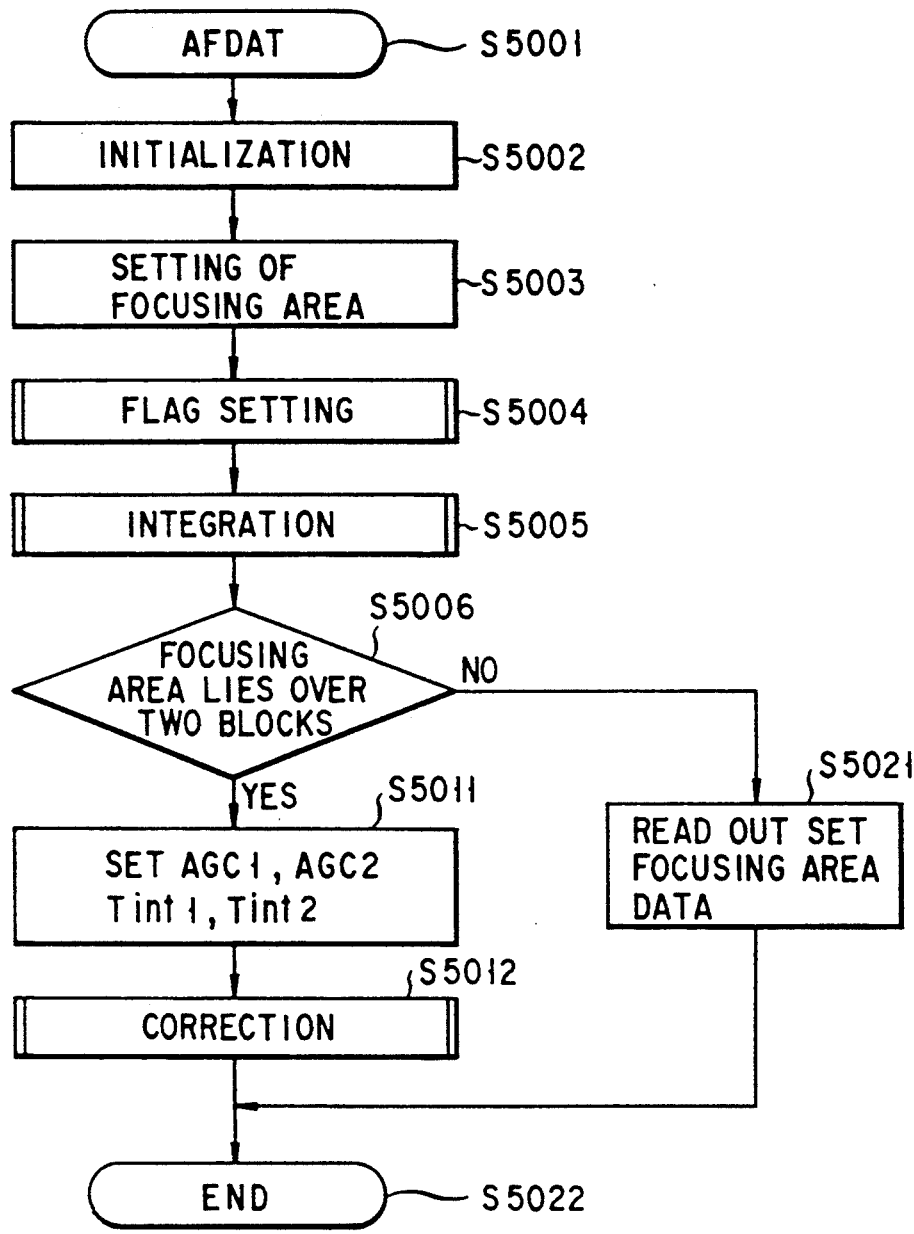
FIG. 21 is a flowchart showing the operation of a third embodiment of this invention.
Figure 22:
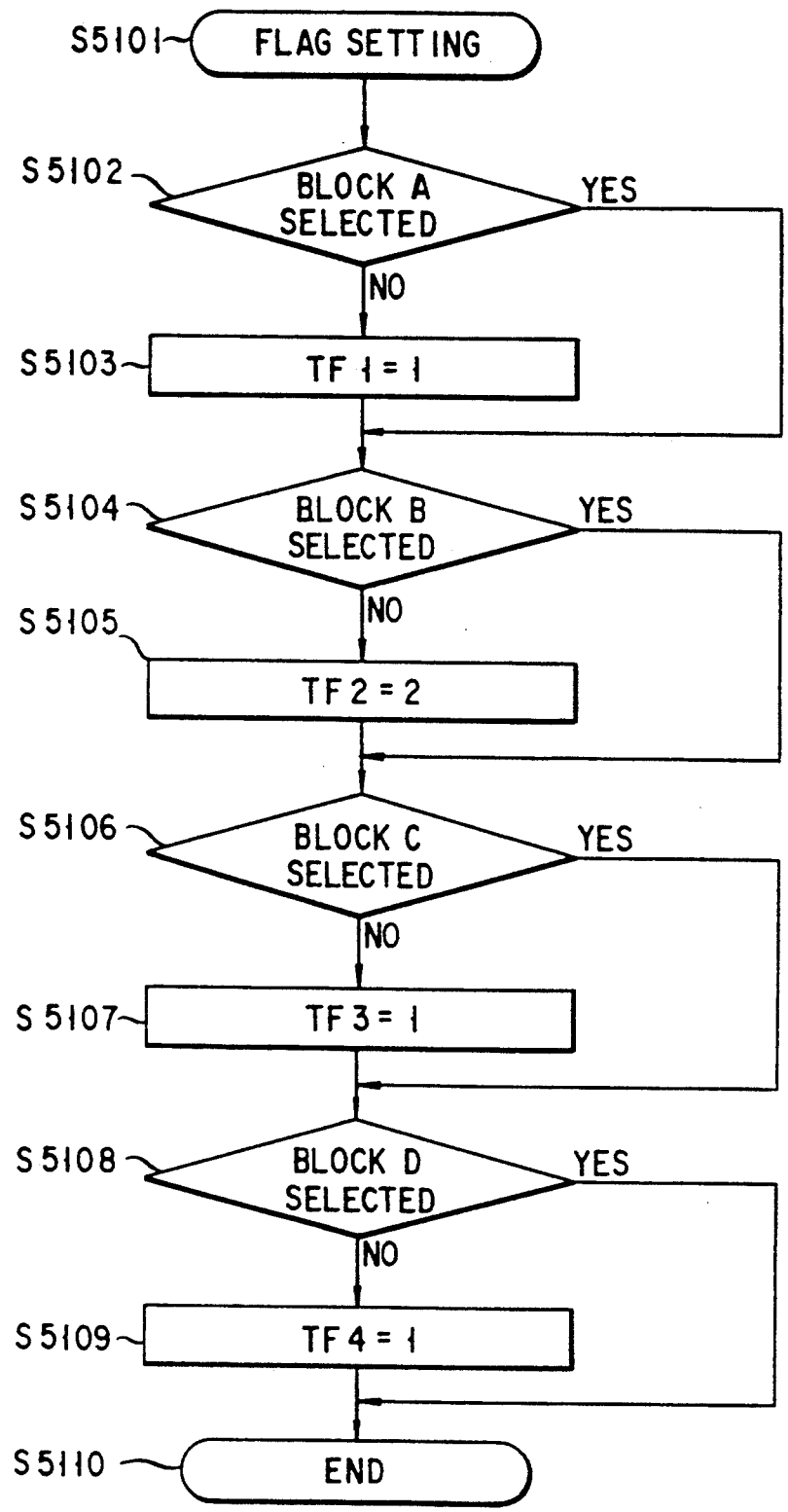
FIG. 22 is a flowchart showing the flag setting sub-routine in the flowchart of FIG. 21.

FIGS. 21 and 22 are a flowchart showing the operation of a third embodiment of this invention.

The construction of the third embodiment is the same as that of the first embodiment, but as shown in FIG. 21, it is different from the first embodiment in that a step S5004 for setting flags (FT1 to FT4) is provided between the focusing area setting step S5003 and the integration step S5005 in the third embodiment. The other steps are the same as those of the first embodiment.

The flag setting step is explained with reference to FIG. 22.

When the flag setting sequence is started, whether the block A is selected or not is checked, and if it is not selected, the flag TF is set to "1" (S5101 to S5103). Next, whether the block B is selected or not is checked, and if it is not selected, the flag TF2 is set to "1" (S5104, S5105). Likewise, whether the block C is selected or not is checked, and if it is not selected, the flag TF3 is set to "1" (S5106, S5107). Further, whether the block D is selected or not is checked, and if it is not selected, the flag TF4 is set to "1" (S5108 to S5110). In this manner, in the steps S5102 to S5110, the selected sensor block is determined and the flag of the non-selected block is set to "1".

As described above, according to the above embodiments, a video signal having an enlarged dynamic rang can be derived with a simple construction and the point of focus can be detected with high precision even when a focusing area is set in a desired position.

Figure 20:
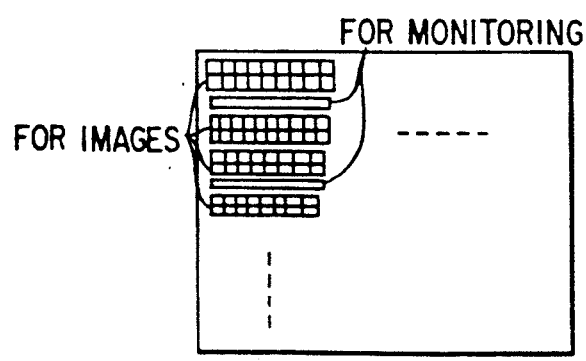
FIG. 20 is a diagram showing another example of the monitor structure.

The monitor structure of FIG. 18 may be changed to such a structure in which the monitor is disposed between the pixel sensors, as shown in FIG. 20. Further, the monitor control can be effected by use of charges of holes or electrons which are present in the hole-electron pairs generated by light energy and which are not subjected to the photoelectric conversion by the photoelectric converting element. In addition, the AF system is not limited to that of the above embodiments.

As described above, in this invention, an adequate video signal can be obtained with a simple construction even if a focusing area is set in a desired position and the point of focus can be detected with high precision.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A point-of-focus detection device comprising:
    an array of charge storage type photoelectric converting elements for converting an amount of light into an electrical signal;
    a plurality of monitoring means respectively disposed for a plurality of photoelectric converting element groups which are obtained by dividing said photoelectric converting elements of said photoelectric converting element array, outputs of said monitoring means respectively representing average amounts of lights respectively received by said photoelectric converting element groups;
    a plurality of storage interruption means for comparing the outputs of said plurality of monitoring means with a preset value and interrupting the charge storage operation of that of said photoelectric converting element groups whose output has reached the preset value;
    storage means for storing charge storage time for the photoelectric converting element group when the charge storage operation is interrupted by said storage interruption means and storing the outputs of said monitoring means for said photoelectric converting element groups when limit time has elapsed after the charge storage operation of said photoelectric converting element was started;
    focusing area setting means for setting a focusing area used for detecting the point of focus in a desired position on an image plane;
    correction means for correcting the outputs of said photoelectric converting elements according to the monitoring time or monitor outputs when the focusing area set by said focusing area setting means lies over at least two of said photoelectric converting element groups; and
    point-of-focus detection means for detecting the point of focus of an area set by said focusing area setting means by use of the outputs of said photoelectric converting elements which are corrected by said correction means.

2. A point-of-focus detection device according to claim 1, wherein when the output of said monitoring means has reached the preset value, the charge storage operation of a corresponding one of said photoelectric converting element groups is interrupted.

3. A point-of-focus detection device according to claim 1, further comprising variable amplifier means for amplifying the outputs of said photoelectric converting elements and the amplification factor of said variable amplifier means is changed according to the monitor output.

4. A point-of-focus detection device comprising:
    a plurality of charge storage type photoelectric converting elements divided into a plurality of groups;
    a plurality of monitoring means respectively provided for said divided photoelectric converting element groups, for outputting monitor signals corresponding to amounts of lights received by said photoelectric converting element groups and interrupting the charge storage operation of that of said photoelectric converting element groups which corresponds to the monitoring means whose output has reached a preset value;
    focusing area setting means for setting a focusing area;
    correction means for correcting the outputs of said photoelectric converting elements when the focusing area set by said focusing area setting means lies over at least two of said photoelectric converting element groups; and
    point-of-focus detection means for detecting the point of focus of an area set by said focusing area setting means by use of the outputs of said photoelectric converting elements which are corrected by said correction means.

5. A point-of-focus detection device according to claim 4, wherein said correction means effects the correction operation based on the outputs of said monitoring means obtained at the time of completion of the charge storage operation by said photoelectric converting element groups.

6. A point-of-focus detection device according to claim 4, wherein said correction means effects the correction operation based on the charge storage time obtained at the time of completion of the charge storage operation by said photoelectric converting element groups.

7. A photoelectric converting device comprising:
    a plurality of charge storage type photoelectric converting elements divided into a plurality of groups;
    a plurality of monitoring means respectively provided for said divided photoelectric converting element groups, for outputting monitor signals corresponding to amounts of lights received by said photoelectric converting element groups;
    first charge storage interruption means for interrupting the charge storage operation of that of said photoelectric converting element groups whose monitoring signal has reached a preset value after said photoelectric converting elements started the charge storage operation;
    second charge storage interruption means for forcedly interrupting the charge storage operation of said photoelectric converting element groups in a case where the charge storage operation is not interrupted by said first charge storage interruption means when a preset time has elapsed after the charge storage operation was started; and
    correction means for correcting outputs of said plurality of respective photoelectric converting element groups to make the outputs of said photoelectric converting elements continuous in a case where the charge storage operations of said plurality of photoelectric converting element groups are interrupted at different timings by said first charge storage interruption means.

8. A photoelectric converting device according to claim 7, wherein said photoelectric converting device includes storing means respectively disposed for said photoelectric converting element groups, for storing time taken until said first charge storage interruption means interrupts the charge storage operation and interruption of the charge storage operation of said first charge storage interruption means and said correction means effects the correcting operation by use of the time stored by said storing means.

9. A photoelectric converting device according to claim 7, wherein said photoelectric converting device includes storing means respectively disposed for said photoelectric converting element groups, for storing the output value of said monitor signal obtained at the time of the charge storage interruption in a case where the charge storage operation is interrupted by said second charge storage interruption means and said correction means effects the correcting operation by use of the monitor signal stored by said storing means.

10. A photoelectric converting device according to claim 7, wherein said second charge storing means counts time after the charge storage operation is started and forcedly interrupts the charge storage operation in a case where the charge storage operations of all of said photoelectric converting element groups are not interrupted even when limit time has elapsed.

11. A photoelectric converting device comprising:
- a plurality of charge storage type photoelectric converting elements divided into a plurality of groups;
- a plurality of monitoring means respectively provided for said divided photoelectric converting element groups, for outputting monitor signals corresponding to amounts of lights received by said photoelectric converting element groups and interrupting the charge storage operation of that of said photoelectric converting element groups which corresponds to the monitoring means whose output has reached a preset value; and
- correction means for respectively correcting outputs of said plurality of photoelectric converting element groups to make the outputs of said photoelectric converting elements continuous in a case where the charge storage operations of said plurality of photoelectric converting element groups are interrupted at different timings by said monitoring means.

12. A photoelectric converting device according to claim 11, wherein said correction means effects the correcting operation based on the output of said monitoring means obtained at the time of completion of the charge storage operation of said photoelectric converting element groups.

13. A photoelectric converting device according to claim 11, wherein said correction means effects the correcting operation based on the charge storage time obtained at the time of completion of the charge storage operation of said photoelectric converting element groups.

14. A photoelectric converting device according to claim 11, wherein when the monitoring signal has reached the preset value, the charge storage operation of a corresponding one of said photoelectric converting element groups is interrupted.

15. A photoelectric converting device according to claim 11, further comprising variable amplifier means for amplifying the outputs of said photoelectric converting elements and the amplification factor of said variable amplifier means is changed according to the monitor output.

16. A distance measuring device of a camera comprising:
- image receiving means having an image receiving plane to which an object image is projected and a plurality of charge storage type photoelectric converting elements arranged on said image receiving plane;
- a plurality of monitoring means respectively provided for a plurality of blocks which are obtained by dividing said image receiving plane of said image receiving means, for outputting signals representing the average charge storage levels of the respective blocks;
- control means for controlling the charge storage operations of said respective blocks based on the outputs of said monitoring means;
- storing means for measuring and storing charge storage times of said blocks;
- setting means for setting a focusing area in a desired position on the object image;
- readout means for reading out an image signal from the charge storage type photoelectric converting block corresponding to the focusing area, said readout means including means for correcting the level of the image signals according to the charge storage times stored in said storing means in a case where the focusing area is set to lie over at least two of said divided blocks; and
- point-of-focus detection means for effecting the point-of-focus detecting operation according to the image signal output from said readout means.

17. A distance measuring device comprising:
- an integration type image sensor having an image receiving plane, for subjecting an object image projected to said image receiving plane to the photoelectric conversion, said image sensor being divided into a plurality of blocks and the integral time being controlled for each of the blocks;
- setting means for setting part of the object image as a distance measuring area;
- readout means for reading out an image signal of an area corresponding to the area set by said setting means from said image sensor, said readout means including means for normalizing the readout image signal by use of the integral times for said respective blocks when the area set by said setting means lies over at leas two of said plurality of blocks; and
- point-of-focus detection means for effecting the point-of-focus detecting operation according to an output from said readout means.

18. A photoelectric converting device comprising:
- an image sensor for subjecting an image to the photoelectric conversion, said image sensor being constructed by a plurality of blocks in which the photoelectric converting operations are independently controlled;
- setting means for setting an area to be read out among the photoelectric converted image signal; and
- readout means for reading out a signal of the area set by said setting means from said image sensor, said readout means including means for normalizing the readout image signal to create a substantially continuous image signal when the area set by said setting means lies over at least two of said plurality of blocks.

19. An image signal outputting device comprising:
- image receiving means having an image receiving plane on which a plurality of charge storage type photoelectric converting elements are arranged;
- adjusting means for adjusting the integral time for each of a plurality of blocks which are obtained by dividing said image receiving plane;
- readout means for reading out an image signal; and normalizing means for normalizing the image signal based on the charge storage integral time for each of said blocks, thereby creating a substantially continuous image signal.

20. An image signal outputting device according to claim 19, wherein said adjusting means includes:
monitoring means provided for each of said blocks, for detecting that the average charge storage level for each of said blocks has reached a preset value;
control means for independently controlling the charge storing operations of each of said blocks in response to an output of said monitoring means; and
storing mean for measuring and storing the charge storage time for each of said blocks.

21. An image signal outputting device comprising:
an image sensor for subjecting an image to the photoelectric conversion, said image sensor being constructed by a plurality of blocks in which the photoelectric converting operations are independently controlled;
readout means for reading out an image signal from said image sensor; and
correction means for correcting the level of the image signal for each of said blocks to make the readout image signals substantially continuous.

22. An image signal outputting device according to claim 21, further comprising means provided on each of said blocks of said image sensor, for monitoring the average photoelectric converted level in each of said blocks and controlling the photoelectric converting operation according to the result of monitoring.

23. An image signal outputting device according to claim 21, wherein said readout means can read out only part of the whole image signal irrespective of said plurality of blocks.

24. An image signal outputting device according to claim 21, wherein said correction means corrects the readout image signal based on the time for the photoelectric converting operation for each of said blocks.

25. A photoelectric converting device comprising:
a plurality of photoelectric converting element groups;
monitoring devices respectively provided for said plurality of photoelectric converting element groups;
an integral time counting device;
a storing device for storing time of completion of the integration;
a focusing area setting device for selecting a desired focusing area; and
a correction device for correcting outputs of the photoelectric converting element group which corresponds to said focusing area setting device according to information stored in said storing device.

26. A photoelectric converting device according to claim 25, wherein said storing device stores the time of completion of the integration for each of blocks of said plurality of photoelectric converting element groups.

27. A photoelectric converting device according to claim 25, wherein said correction device effects the correcting operation only when a selected focusing area lies over at least two of said plurality of photoelectric converting element groups.

28. A photoelectric converting device according to claim 25, wherein said monitoring device effects the monitoring operation only for the selected focusing area.

29. A photoelectric converting device comprising:
a plurality of photoelectric converting element groups;
monitoring devices respectively provided for said plurality of photoelectric converting element groups;
an integral time counting device;
storing means for storing time of completion of the integration;
a focusing area setting device for selecting a desired focusing area; and
a correction device for correcting outputs of said photoelectric converting element groups according to information stored in said storing device.

30. A photoelectric converting device according to claim 29, wherein said storing device stores the time of completion of the integration for each of blocks of said plurality of photoelectric converting element groups.

31. A photoelectric converting device comprising:
a plurality of photoelectric converting element groups;
monitoring devices respectively provided for said plurality of photoelectric converting element groups;
a storing device for storing information of integration output;
storing means for storing time of completion of the integration; and
a correction device for correcting outputs of said photoelectric converting element groups according to information stored in said storing means.

32. A photoelectric converting device according to claim 31, wherein said storing device stores the time of completion of the integration and an amplification factor at the readout time.

33. A photoelectric converting device according to claim 31, wherein said storing device stores information for each of blocks of said plurality of photoelectric converting element groups.

* * * * *